(12) United States Patent
Tamori et al.

(10) Patent No.: US 11,815,887 B2
(45) Date of Patent: Nov. 14, 2023

(54) VEHICLE CONTROL DEVICE, VEHICLE CONTROL METHOD, VEHICLE, INFORMATION PROCESSING DEVICE, INFORMATION PROCESSING METHOD, AND PROGRAM

(71) Applicant: Sony Group Corporation, Tokyo (JP)

(72) Inventors: Masahiro Tamori, Tokyo (JP); Nobuhiro Jogano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 239 days.

(21) Appl. No.: 17/293,918

(22) PCT Filed: Dec. 6, 2019

(86) PCT No.: PCT/JP2019/047764
§ 371 (c)(1),
(2) Date: May 14, 2021

(87) PCT Pub. No.: WO2020/129688
PCT Pub. Date: Jun. 25, 2020

(65) Prior Publication Data
US 2022/0019218 A1    Jan. 20, 2022

(30) Foreign Application Priority Data
Dec. 20, 2018 (JP) ................. 2018-237946

(51) Int. Cl.
G05D 1/00 (2006.01)
B60W 30/06 (2006.01)
G05D 1/02 (2020.01)

(52) U.S. Cl.
CPC ........... G05D 1/0027 (2013.01); B60W 30/06 (2013.01); G05D 1/0223 (2013.01); *G05D 2201/0213* (2013.01)

(58) Field of Classification Search
CPC ............... G05D 1/0027; G05D 1/0223; G05D 2201/0213; B60W 30/06
See application file for complete search history.

(56) References Cited

U.S. PATENT DOCUMENTS 9,557,741 B1 * 1/2017 Elie ................. G01B 11/22
9,896,091 B1 * 2/2018 Kurt ................. G05D 1/0088
(Continued)

FOREIGN PATENT DOCUMENTS

EP    3284654 A1 *  2/2018  ........... B60W 30/06
JP    2011-178264 A    9/2011
(Continued)

OTHER PUBLICATIONS

English Translation of the Written Opinion of the International Search Authority for PCT/JP2019/047764 filed Jun. 20, 2021 (Year: 2021).*

(Continued)

*Primary Examiner* — Calvin Cheung
(74) *Attorney, Agent, or Firm* — XSENSUS LLP

(57) ABSTRACT

A vehicle control device includes a remote operation control unit that approves a remote operation right (a right to perform a remote operation of a vehicle) and an operation control unit that controls an operation of the vehicle according to a remote operation performed in response to an instruction by an information processing device to which the remote operation right is granted to another vehicle to move. The information processing device includes a vehicle detection unit that detects a first vehicle and a vehicle control unit that requests a remote operation right that is a right to remotely operate the first vehicle and remotely operates the first vehicle in response to an instruction to move a second vehicle in a case where the remote operation right is granted. The present technology is applied to, for example, a vehicle (Continued)

that performs automatic driving or a control device of a parking lot.

20 Claims, 7 Drawing Sheets

(56) References Cited

U.S. PATENT DOCUMENTS

| 9,947,147 | B1* | 4/2018 | Kwak | G07C 5/085 |
|---|---|---|---|---|
| 2007/0150336 | A1* | 6/2007 | Boily | G07B 15/00 |
| | | | | 705/13 |
| 2013/0117078 | A1* | 5/2013 | Weik, III | G06Q 10/00 |
| | | | | 705/13 |
| 2019/0371176 | A1* | 12/2019 | Montemurro | H04L 67/125 |
| 2020/0198620 | A1* | 6/2020 | Nakata | B60W 60/0053 |

FOREIGN PATENT DOCUMENTS

| JP | 2015-230641 | A | 12/2015 | |
|---|---|---|---|---|
| JP | 2017-138924 | A | 8/2017 | |
| JP | 2017-204151 | A | 11/2017 | |
| JP | 2018-077845 | A | 5/2018 | |
| WO | WO-2014090533 | A1 * | 6/2014 | ............ G07B 15/04 |

OTHER PUBLICATIONS

JP 2018190215 A with English translation. Filed May 9, 2017. Published Nov. 19, 2018. (Year: 2018).*
KR 101119533 B1 with English translation. Filed May 14, 2010. Published Feb. 28, 2012. (Year: 2012).*
DE 102015202467 A1 with English translation. Filed Feb. 12, 2015. Published Aug. 18, 2016. (Year: 2016).*
International Search Report and Written Opinion dated Feb. 25, 2020, received for PCT Application PCT/JP2019/047764, Filed on Dec. 6, 2019, 10 pages including English Translation.

* cited by examiner

VEHICLE CONTROL DEVICE, VEHICLE CONTROL METHOD, VEHICLE, INFORMATION PROCESSING DEVICE, INFORMATION PROCESSING METHOD, AND PROGRAM

CROSS-REFERENCE TO RELATED APPLICATIONS

The present application is based on PCT filing PCT/JP2019/047764, filed Dec. 6, 2019, which claims priority to JP 2018-237946, filed Dec. 20, 2018, the entire contents of each are incorporated herein by reference.

TECHNICAL FIELD

The present technology relates to a vehicle control device, a vehicle control method, a vehicle, an information processing device, an information processing method, and a program, and particularly, to a vehicle control device, a vehicle control method, a vehicle, an information processing device, an information processing method, and a program that enable smooth parking and unloading of a vehicle.

BACKGROUND ART

Conventionally, it has been proposed that, when a user presses a remote control key button, instructions are transmitted to two vehicles parallel parking in a parking lot where three sides are surrounded, the front vehicle is unloaded once, the vehicle on the back side is unloaded next, and the front vehicle is parked again so as to automatically unload the vehicle on the back side (for example, refer to Patent Document 1).

CITATION LIST

Patent Document

Patent Document 1: Japanese Patent Application Laid-Open No. 2011-178264

SUMMARY OF THE INVENTION

Problems to be Solved by the Invention

However, the invention described in Patent Document 1 is made on the assumption that vehicle information regarding the two vehicles has been registered in the remote control key in advance. Therefore, the invention described in Patent Document 1 can be applied to, for example, a case where a vehicle to be parked is determined in advance as in a parking at home. However, it is difficult to apply the invention described in Patent Document 1 to a case where a vehicle to be parked is not determined in advance as in a public parking lot.

The present technology has been made in consideration of such a situation, and enables smooth parking and unloading of a vehicle.

Solutions to Problems

A vehicle control device according to a first aspect of the present technology includes a remote operation control unit that approves a remote operation right that is a right to perform a remote operation of a vehicle and an operation control unit that controls an operation of the vehicle according to a remote operation performed in response to an instruction by an information processing device to which the remote operation right is granted to another vehicle to move.

A vehicle control method according to the first aspect of the present technology, performed by a vehicle control device, includes approving a remote operation right that is a right to perform a remote operation of a vehicle and controlling an operation of the vehicle according to a remote operation performed in response to an instruction by an information processing device to which the remote operation right is granted to another vehicle to move.

A program according to the first aspect of the present technology causes a computer to execute processing including approving a remote operation right that is a right to perform a remote operation of a vehicle and controlling an operation of the vehicle according to a remote operation performed in response to an instruction by an information processing device to which the remote operation right is granted to another vehicle to move.

A vehicle according to a second aspect of the present technology includes a driving unit, a remote operation control unit that approves a remote operation right that is a right to perform a remote operation, and an operation control unit that controls the driving unit according to a remote operation performed in response to an instruction by an information processing device to which the remote operation right is granted to another vehicle to move.

An information processing device according to a third aspect of the present technology includes a vehicle detection unit that detects a first vehicle and a vehicle control unit that requests a remote operation right that is a right to remotely operate the first vehicle and remotely operates the first vehicle in response to an instruction to move a second vehicle in a case where the remote operation right is granted.

An information processing method, performed by the information processing device, according to the third aspect of the present technology includes detecting a first vehicle, requesting a remote operation right that is a right to remotely operate the first vehicle, and remotely operating the first vehicle in response to an instruction to move a second vehicle in a case where the remote operation right is granted.

A program according to the third aspect of the present technology causes a computer to execute processing including steps for detecting a first vehicle, requesting a remote operation right that is a right to remotely operate the first vehicle, and remotely operating the first vehicle in response to an instruction to move a second vehicle in a case where the remote operation right is granted.

In the first aspect of the present technology, the remote operation right that is the right to perform the remote operation of the vehicle is approved, and the operation of the vehicle is controlled according to the remote operation performed in response to the instruction, by the information processing device to which the remote operation right is granted, to the other vehicle to move.

In the second aspect of the present technology, the remote operation right that is the right to perform the remote operation is approved, and the driving unit is controlled according to the remote operation performed in response to the instruction, by the information processing device to which the remote operation right is granted, to the other vehicle to move.

In the third aspect of the present technology, the first vehicle is detected, the remote operation right that is the right to remotely operate the first vehicle is requested, and the first vehicle is remotely operated in response to the instruction to move the second vehicle in a case where the remote operation right is granted.

MODE FOR CARRYING OUT THE INVENTION

Hereinafter, modes for carrying out the present technology will be described. The description will be made in the following order.

1. Embodiment
2. Modification
3. Others

1. Embodiment

First, an embodiment of the present technology will be described with reference to FIGS. 1 to 8.

Exemplary Configuration of Parking Control System 1

Figure 1:
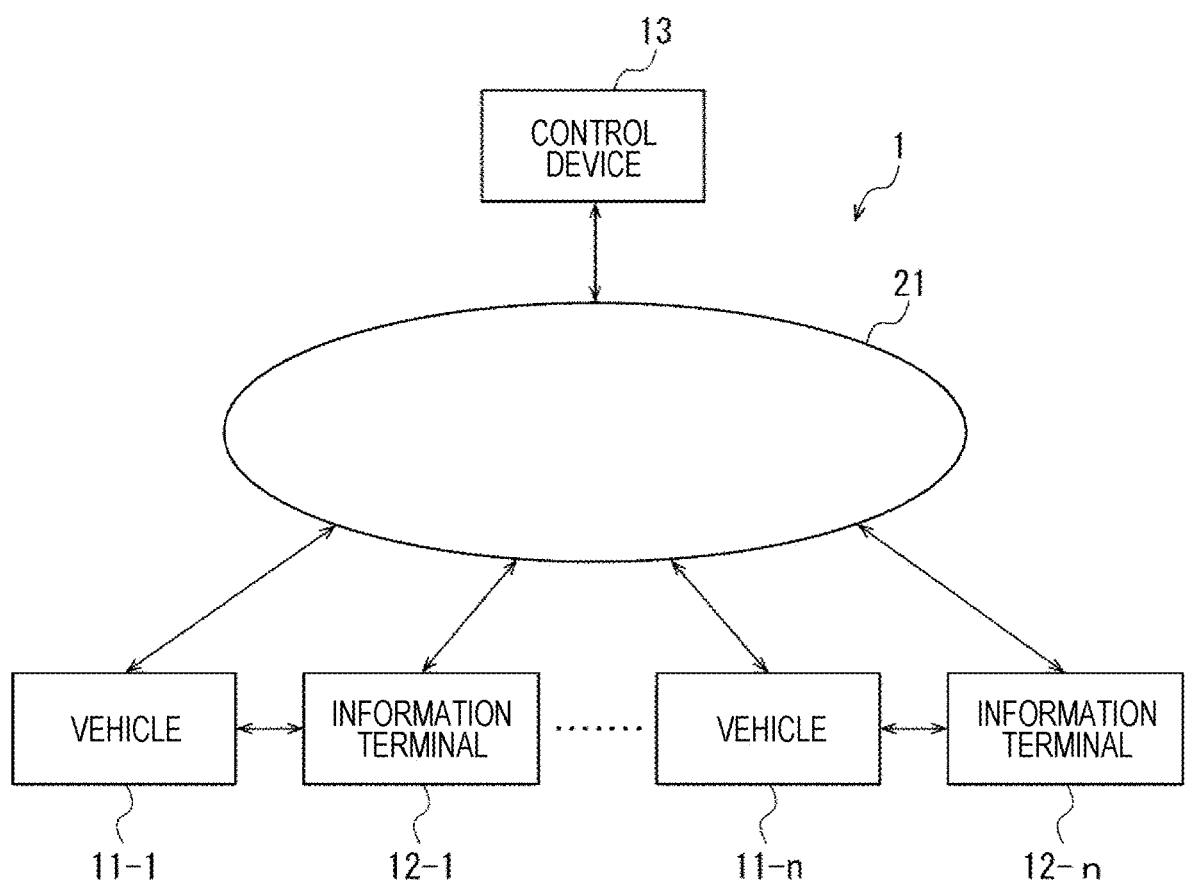
FIG. 1 is a block diagram illustrating an embodiment of a parking control system to which the present technology is applied.

FIG. 1 illustrates an exemplary configuration of a parking control system 1 to which the present technology is applied.

The parking control system 1 is a system that controls parking and unloading of a vehicle in a parking lot.

The parking control system 1 includes vehicles 11-1 to 11-n, information terminals 12-1 to 12-n, a control device 13, and a network 21. The vehicles 11-1 to 11-n, the information terminals 12 to 12-n, and the control device 13 are connected to each other via the network 21 and communicate with each other. The vehicle 11-i (i=1 to n) and the information terminal 12-i (i=1 to n) can directly communicate with each other, not through the network 21. Furthermore, the vehicles 11-1 to 11-n can directly communicate with each other, not through the network 21.

Note that, hereinafter, in a case where it is not necessary to distinguish the vehicles 11-1 to 11-n and the information terminals 12-1 to 12-n from each other, the vehicles 11-1 to 11-n are simply referred to as a vehicle 11, and the information terminals 12-1 to 12-n are simply referred to as an information terminal 12.

Furthermore, it is not necessary for the vehicle 11 and the information terminal 12 to have a one-to-one relationship. For example, the plurality of information terminals 12 may be associated with the single vehicle 11, or the plurality of vehicles 11 may be associated with the single information terminal 12.

The vehicle 11 can be automatically driven, and some operations may be remotely performed (remotely controlled) from outside.

The information terminal 12 is configured by, for example, a mobile information terminal such as a smartphone or a mobile phone or an information terminal for the vehicle 11 such as a key fob. The information terminal 12 communicates with the vehicle 11 via the network 21 or directly to issue an instruction to the vehicle 11 or acquire various information from the vehicle 11. Furthermore, the information terminal 12 communicates with the control device 13 via the network 21 and exchanges various information with the control device 13.

The control device 13 is provided in a parking lot. The control device 13 communicates with each vehicle 11 via the network 21 and remotely operates each vehicle 11 so as to control a position of each vehicle 11 in the parking lot.

Exemplary Configuration of Parking Lot 51

Figure 2:
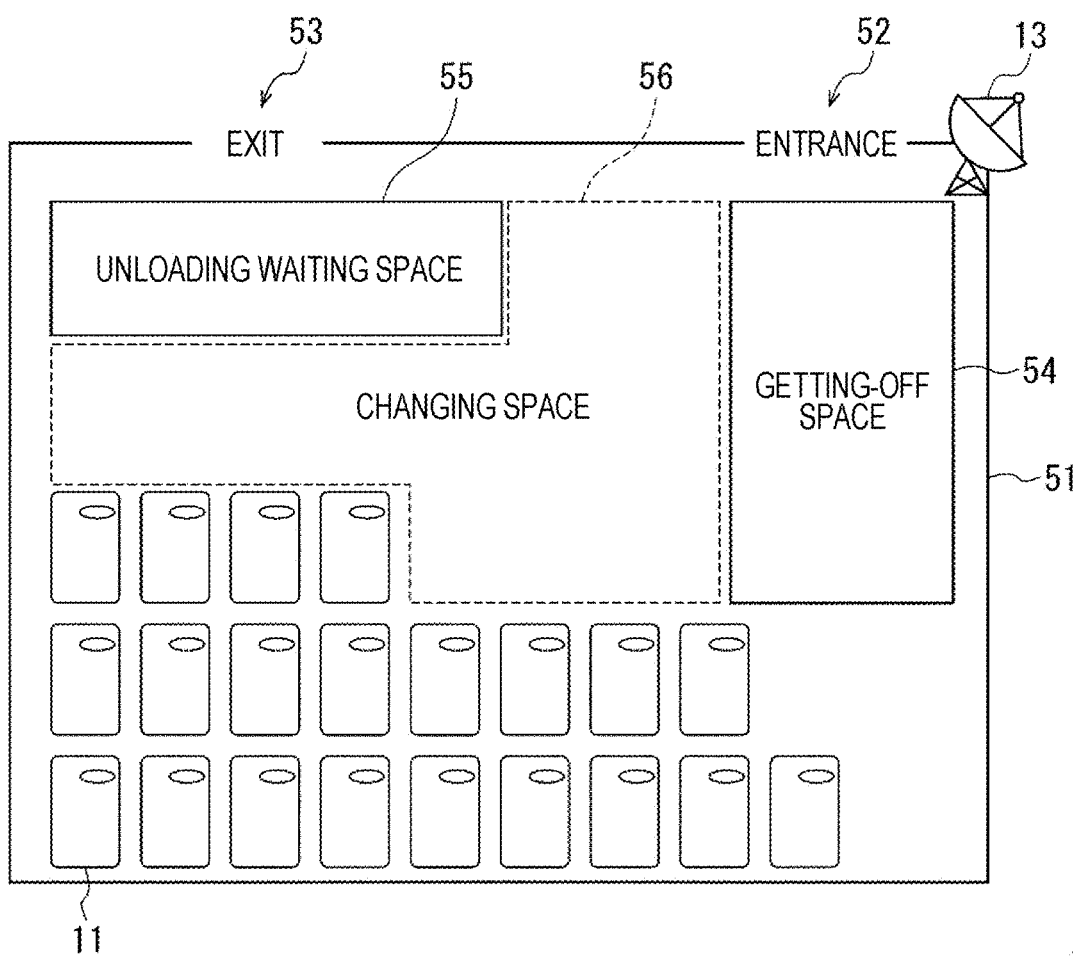
FIG. 2 is a diagram illustrating an exemplary configuration of a parking lot.

FIG. 2 schematically illustrates an exemplary configuration of a parking lot 51 in which the parking control system 1 is provided.

In the parking lot 51, an entrance 52 and an exit 53 are provided. For example, an entrance gate (not illustrated) is provided at the entrance 52, and an exit gate (not illustrated) is provided at the exit 53. Opening and closing of the entrance gate and the exit gate are controlled by the control device 13.

A dedicated getting-off space 54 and an unloading waiting space 55 are provided in the parking lot 51. Then, a space other than the getting-off space 54 and the unloading waiting space 55 is used as a parking space for each vehicle 11.

For example, after entering the parking lot 51 from the entrance 52, the vehicle 11 is temporarily stopped in the getting-off space 54. Then, as described later, the control device 13 remotely operates the vehicle 11 so as to move the vehicle 11 to a parking position after a user in the vehicle 11 gets off. Furthermore, as described later, in a case where the vehicle 11 is unloaded, the control device 13 remotely operates the vehicle 11 to as to move the vehicle 11 from the parking position to the unloading waiting space 55. Then, after the user gets into the vehicle 11 stopping in the unloading waiting space 55, the vehicle 11 goes out from the parking lot 51 through the exit 53.

Here, as described later, in order to move each vehicle 11 to the parking position or move the vehicle 11 from the parking position to the unloading waiting space 55, the control device 13 remotely operates each vehicle 11 to change the vehicles 11 as necessary. At this time, a part of the parking space is secured as a changing space 56 and is used to change the vehicles 11.

Exemplary Configuration of Vehicle Control System 100

Figure 3:
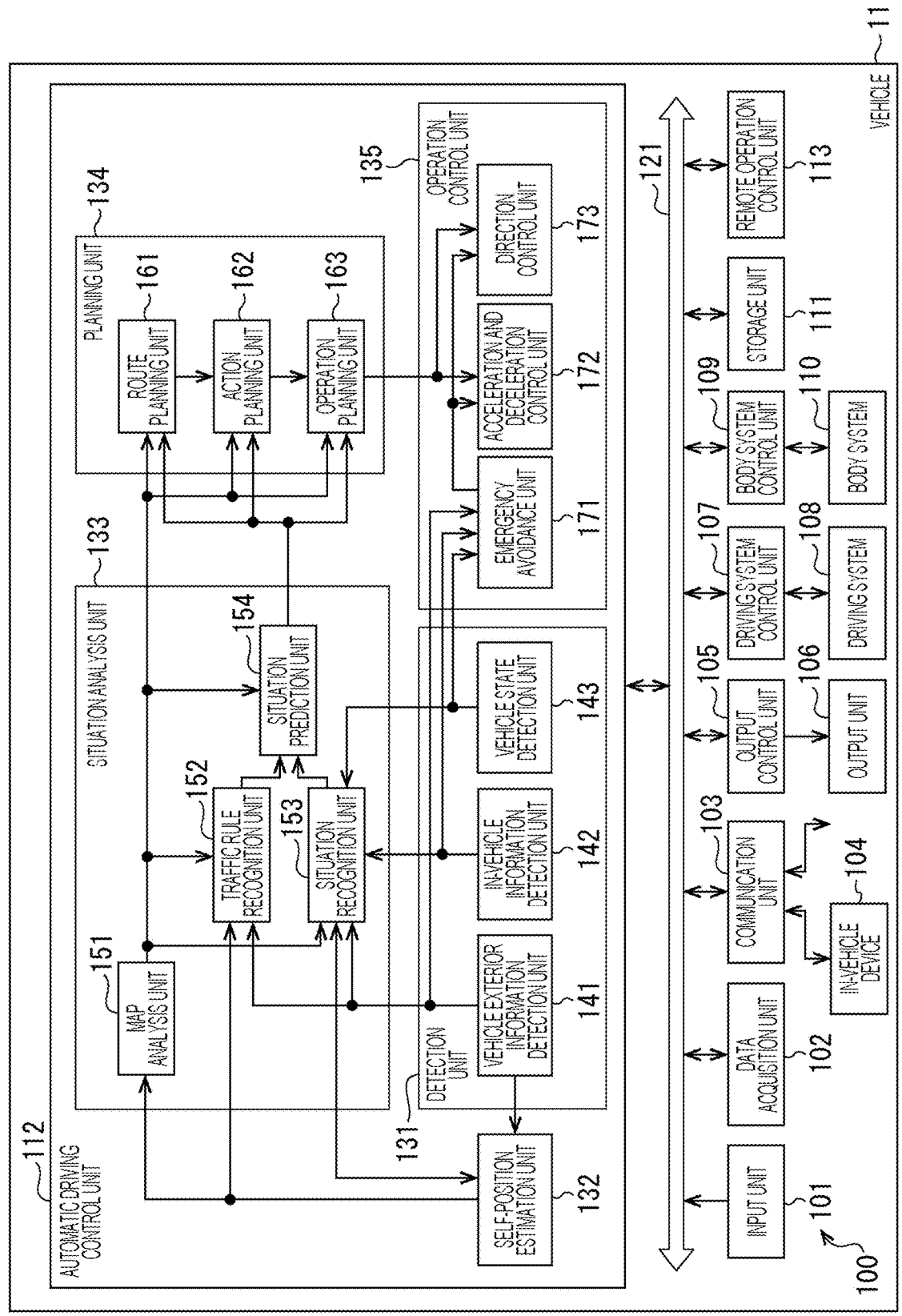
FIG. 3 is a block diagram illustrating an exemplary configuration of a vehicle control unit.

FIG. 3 is a block diagram illustrating an exemplary configuration of a schematic function of a vehicle control system 100 provided in each vehicle 11 which is an example of a mobile body control system to which the present technology may be applied.

Note that, hereinafter, in a case where each vehicle 11 is distinguished from another vehicle 11, the each vehicle 11 is referred to as an own vehicle.

The vehicle control system 100 includes an input unit 101, a data acquisition unit 102, a communication unit 103, an in-vehicle device 104, an output control unit 105, an output unit 106, a driving system control unit 107, a driving system 108, a body system control unit 109, a body system 110, a storage unit 111, an automatic driving control unit 112, and a remote operation control unit 113. The input unit 101, the data acquisition unit 102, the communication unit 103, the output control unit 105, the driving system control unit 107, the body system control unit 109, the storage unit 111, the automatic driving control unit 112, and the remote operation control unit 113 are mutually connected via a communication network 121. The communication network 121 includes, for example, an in-vehicle communication network compliant with an optional standard, for example, a Controller Area-network (CAN), a Local Interconnect-network (LIN), a Local Area-network (LAN), or the FlexRay (registered trademark), a bus, or the like. Note that each unit of the vehicle control system 100 may be directly connected without the communication network 121.

Note that, hereinafter, in a case where each unit of the vehicle control system 100 performs communication via the communication network 121, description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes a device used by an occupant to input various data, instructions, or the like. For example, the input unit 101 includes an operation device such as a touch panel, a button, a microphone, a switch, or a lever and an operation device that can perform input using a method other than a manual operation using sounds, gestures, or the like. Furthermore, for example, the input unit 101 may be an external connection device such as a remote control device that uses infrared rays and other radio waves or a mobile device, a wearable device, or the like that is compatible with the operation of the vehicle control system 100. The input unit 101 generates an input signal on the basis of data, instructions, or the like input by the occupant and supplies the input signal to each unit of the vehicle control system 100.

The data acquisition unit 102 includes various sensors or the like that acquire data used for processing of the vehicle control system 100 and supplies the acquired data to each unit of the vehicle control system 100.

For example, the data acquisition unit 102 includes various sensors that detect a state of the own vehicle or the like. Specifically, for example, the data acquisition unit 102 includes a gyro sensor, an acceleration sensor, an inertial measurement device (IMU), sensors that detect an operation amount of an acceleration pedal, an operation amount of a brake pedal, a steering angle of a steering wheel, an engine speed, a motor speed, a wheel rotation speed, or the like.

Furthermore, for example, the data acquisition unit 102 includes various sensors that detect information outside the own vehicle. Specifically, for example, the data acquisition unit 102 includes an imaging device such as a Time Of Flight (ToF) camera, a stereo camera, a monocular camera, an infrared camera, or other camera. Furthermore, for example, the data acquisition unit 102 includes an environmental sensor that detects the weather, the meteorological phenomenon, or the like and a surrounding information detection sensor that detects an object around the own vehicle. The environmental sensor includes, for example, a raindrop sensor, a fog sensor, a sunshine sensor, a snow sensor, or the like. The surrounding information detection sensor includes, for example, an ultrasonic wave sensor, a radar, a Light Detection and Ranging and Laser Imaging Detection and Ranging (LiDAR), a sonar, or the like.

Moreover, for example, the data acquisition unit 102 includes various sensors that detect a current position of the own vehicle. Specifically, for example, the data acquisition unit 102 includes a Global-Navigation Satellite System (GNSS) receiver or the like that receives a GNSS signal from a GNSS satellite.

Furthermore, for example, the data acquisition unit 102 includes various sensors that detect in-vehicle information. Specifically, for example, the data acquisition unit 102 includes an imaging device that images a driver, a biometric sensor that detects biological information of the driver, a microphone that collects sounds in the vehicle interior, or the like. The biometric sensor is provided, for example, in a seat surface, a steering wheel, or the like and detects biological information of an occupant who sits on the seat or a driver who holds a steering wheel.

The communication unit 103 communicates with the in-vehicle device 104, various devices outside the vehicle, a server, a base station, or the like. The communication unit 103 transmits data supplied from each unit of the vehicle control system 100 and supplies the received data to each unit of the vehicle control system 100. Note that a communication protocol supported by the communication unit 103 is not particularly limited. Furthermore, the communication unit 103 can support a plurality of types of communication protocols.

For example, the communication unit 103 performs wireless communication with the in-vehicle device 104 by using a wireless LAN, the Bluetooth (registered trademark), Near Field Communication (NFC), a Wireless USB (WUSB), or the like. Furthermore, for example, the communication unit 103 performs wired communication with the in-vehicle device 104 by using a Universal Serial Bus (USB), the High-Definition Multimedia Interface (HDMI) (registered trademark), the Mobile High-definition Link (MHL), or the like via a connection terminal which is not illustrated (and cable as necessary).

Moreover, for example, the communication unit 103 communicates with a device (for example, application server or control server) that exists on an external network (for example, the Internet, cloud network, or company-specific network) via a base station or an access point. Furthermore, for example, the communication unit 103 communicates with a terminal near the own vehicle (for example, terminal of pedestrian or shop or Machine Type Communication (MTC) terminal) by using the Peer To Peer (P2P) technology. Moreover, for example, the communication unit 103 performs V2X communication such as Vehicle to Vehicle (intervehicle) communication, Vehicle to Infrastructure (between vehicle and infrastructure) communication, Vehicle to Home (between own vehicle and home) communication, and Vehicle to Pedestrian (between vehicle and pedestrian) communication. Furthermore, for example, the communication unit 103 includes a beacon reception unit, receives radio waves or electromagnetic waves transmitted from a wireless station installed on a road or the like, and acquires information including the current position, congestion, traffic regulations, a required time, or the like.

The in-vehicle device 104 includes, for example, a mobile device or a wearable device of the occupant, or an information device carried in or attached to the own vehicle, and a navigation device that searches for a route to an optional destination or the like.

The output control unit 105 controls an output of various information to the occupant of the own vehicle or the outside of the own vehicle. For example, the output control unit 105 generates an output signal including at least one of visual information (for example, image data) or auditory information (for example, audio data) and supplies the generated signal to the output unit 106 so as to control the outputs of the visual information and the auditory information from the output unit 106. Specifically, for example, the output control unit 105 synthesizes pieces of image data imaged by different imaging devices of the data acquisition unit 102, generates a bird's eye image, a panoramic image, or the like, and supplies an output signal including the generated image to the output unit 106. Furthermore, for example, the output control unit 105 generates audio data including warning sound, a warning message, or the like for danger such as collision, contact, entry to a dangerous zone, or the like, and supplies an output signal including the generated audio data to the output unit 106.

The output unit 106 includes a device that can output the visual information or the auditory information to the occupant of the own vehicle or the outside of the vehicle. For example, the output unit 106 includes a display device, an instrument panel, an audio speaker, a headphone, a wearable device such as a glass-shaped display worn by the occupant or the like, a projector, a lamp, or the like. The display device included in the output unit 106 may be a device that displays the visual information in a field of view of the driver, for example, a head-up display, a transmissive display, a device having an Augmented Reality (AR) display function, or the like, in addition to a device having a normal display.

The driving system control unit 107 generates various control signals and supplies the generated signals to the driving system 108 so as to control the driving system 108. Furthermore, the driving system control unit 107 supplies the control signal to each unit other than the driving system 108 as necessary and issues a notification of a control state of the driving system 108 or the like.

The driving system 108 includes various devices related to the driving system of the own vehicle. For example, the driving system 108 includes a driving force generation device that generates a driving force such as an internal combustion engine, a driving motor, or the like, a driving force transmission mechanism that transmits the driving force to the wheels, a steering mechanism that adjusts a steering angle, a braking device that generates a braking force, an Antilock Brake System (ABS), an Electronic Stability Control (ESC), an electronic power steering device, or the like.

The body system control unit 109 generates various control signals and supplies the generated signals to the body system 110 so as to control the body system 110. Furthermore, the body system control unit 109 supplies the control signal to each unit other than the body system 110 as necessary and issues a notification of a control state of the body system 110 or the like.

The body system 110 includes various body-system devices mounted on the vehicle body. For example, the body system 110 includes a keyless entry system, a smart key system, a power window device, a power seat, a steering wheel, an air conditioner, various lamps (for example, headlights, backlights, indicators, fog lights, or the like), or the like.

The storage unit 111 includes, for example, a magnetic storage device such as a Read Only Memory (ROM), a Random Access Memory (RAM), or a Hard Disc Drive (HDD), a semiconductor storage device, an optical storage device, a magneto-optical storage device, or the like. The storage unit 111 stores various programs, data, or the like used by each unit of the vehicle control system 100. For example, the storage unit 111 stores map data such as a three-dimensional high-accuracy map such as a dynamic map, a global map that covers a wide area and has lower accuracy than the high-accuracy map, a local map including information around the own vehicle, or the like.

The automatic driving control unit 112 controls automatic driving such as autonomous traveling or driving assistance. Specifically, for example, the automatic driving control unit 112 performs cooperative control to realize a function of an Advanced Driver Assistance System (ADAS) including collision avoidance or impact relaxation of the own vehicle, following traveling based on a distance between vehicles, a vehicle speed maintaining travel, an own vehicle collision warning, a lane deviation warning of the own vehicle, or the like. Furthermore, for example, the automatic driving control unit 112 performs cooperative control for automatic driving for autonomously traveling the vehicle without depending on an operation by the driver. The automatic driving control unit 112 includes a detection unit 131, a self-position estimation unit 132, a situation analysis unit 133, a planning unit 134, and an operation control unit 135.

The detection unit 131 detects various information necessary for controlling automatic driving. The detection unit 131 includes a vehicle exterior information detection unit 141, an in-vehicle information detection unit 142, and a vehicle state detection unit 143.

The vehicle exterior information detection unit 141 executes processing for detecting information outside the own vehicle on the basis of the data or the signal from each unit of the vehicle control system 100. For example, the vehicle exterior information detection unit 141 executes detection processing, recognition processing, and tracking processing on an object around the own vehicle and processing for detecting a distance to an object. The object to be detected includes, for example, a vehicle, a person, an obstacle, a structure, a road, a traffic light, a traffic sign, a road marking, or the like. Furthermore, for example, the vehicle exterior information detection unit 141 executes processing for detecting environment around the own vehicle. The surrounding environment to be detected includes, for example, the weather, the temperature, the humidity, the brightness, the state of the road surface, or the like. The vehicle exterior information detection unit 141 supplies data indicating the result of the detection processing to the self-position estimation unit 132, a map analysis unit 151, a traffic rule recognition unit 152, and a situation recognition unit 153 of the situation analysis unit 133, and an emergency avoidance unit 171 of the operation control unit 135, or the like.

The in-vehicle information detection unit 142 executes processing for detecting in-vehicle information on the basis of the data or the signal from each unit of the vehicle control system 100. For example, the in-vehicle information detection unit 142 executes processing for authenticating and recognizing the driver, processing for detecting the driver's state, processing for detecting the occupant, processing for detecting in-vehicle environment, or the like. The driver's state to be detected includes, for example, a physical condition, a wakefulness degree, a concentration level, a fatigue level, a line-of-sight direction, or the like. The in-vehicle environment to be detected includes, for example, the temperature, the humidity, the brightness, the odor, or the like. The in-vehicle information detection unit 142 supplies data indicating the result of the detection processing to the situation recognition unit 153 of the situation analysis unit 133, the emergency avoidance unit 171 of the operation control unit 135, or the like.

The vehicle state detection unit 143 executes processing for detecting the state of the own vehicle on the basis of the data or the signal from each unit of the vehicle control system 100. The state of the own vehicle to be detected includes, for example, the speed, the acceleration, the steering angle, whether or not an abnormality occurs, content of the abnormality, a driving operation state, a position and inclination of a power seat, a door lock state, states of other in-vehicle devices, or the like. The vehicle state detection unit 143 supplies data indicating the result of the detection processing to the situation recognition unit 153 of the situation analysis unit 133, the emergency avoidance unit 171 of the operation control unit 135, or the like.

The self-position estimation unit 132 executes processing for estimating a position, a posture, or the like of the own vehicle on the basis of the data or the signal from each unit of the vehicle control system 100 such as the vehicle exterior information detection unit 141, the situation recognition unit 153 of the situation analysis unit 133, or the like. Furthermore, the self-position estimation unit 132 generates a local map used to estimate a self-position (hereinafter, referred to as self-position estimation map) as necessary. The self-position estimation map is, for example, a map with high accuracy using a technology such as Simultaneous Localization and Mapping (SLAM). The self-position estimation unit 132 supplies data indicating the result of the estimation processing to the map analysis unit 151, the traffic rule recognition unit 152, the situation recognition unit 153, or the like of the situation analysis unit 133. Furthermore, the self-position estimation unit 132 makes the storage unit 111 store the self-position estimation map.

The situation analysis unit 133 executes processing for analyzing the situations of the own vehicle and surroundings. The situation analysis unit 133 includes the map analysis unit 151, the traffic rule recognition unit 152, the situation recognition unit 153, and a situation prediction unit 154.

While using the data or the signal from each unit of the vehicle control system 100 such as the self-position estimation unit 132, the vehicle exterior information detection unit 141, or the like as necessary, the map analysis unit 151 executes processing for analyzing various maps stored in the storage unit 111 and constructs a map including information necessary for automatic driving processing. The map analysis unit 151 supplies the constructed map to the traffic rule recognition unit 152, the situation recognition unit 153, the situation prediction unit 154, and a route planning unit 161, an action planning unit 162, an operation planning unit 163, or the like of the planning unit 134.

The traffic rule recognition unit 152 executes processing for recognizing traffic rules around the own vehicle on the basis of the data or the signal from each unit of the vehicle control system 100 such as the self-position estimation unit 132, the vehicle exterior information detection unit 141, or the map analysis unit 151. According to this recognition processing, for example, a position and a state of a traffic light around the own vehicle, content of traffic regulations around the own vehicle, a traffic lane on which the own vehicle can travel, or the like are recognized. The traffic rule recognition unit 152 supplies data indicating the result of the recognition processing to the situation prediction unit 154 or the like.

The situation recognition unit 153 executes processing for recognizing a situation of the own vehicle on the basis of the data or the signal from each unit of the vehicle control system 100 such as the self-position estimation unit 132, the vehicle exterior information detection unit 141, the in-vehicle information detection unit 142, the vehicle state detection unit 143, or the map analysis unit 151. For example, the situation recognition unit 153 executes processing for recognizing a situation of the own vehicle, a situation around the own vehicle, a situation of the driver of the own vehicle, or the like. Furthermore, the situation recognition unit 153 generates a local map used to recognize the situation around the own vehicle (hereinafter, referred to as situation recognition map) as necessary. The situation recognition map is, for example, an Occupancy Grid Map (Occupancy Grid Map).

The situation of the own vehicle to be recognized includes, for example, the position of the own vehicle, a posture, a movement (for example, speed, acceleration, moving direction, or the like), whether or not an abnormality occurs, content, or the like. The situation around the own vehicle to be recognized includes, for example, a type and a position of a stationary object around the own vehicle, a type of a moving object around the own vehicle, a position and a movement (for example, speed, acceleration, moving direction, or the like), a configuration of a road around the own vehicle and a state of a road surface, and the weather, the temperature, the humidity, the brightness, or the like around the own vehicle. The driver's state to be detected includes, for example, a physical condition, a wakefulness degree, a concentration level, a fatigue level, a line-of-sight movement, a driving operation, or the like.

The situation recognition unit 153 supplies data indicating the result of the recognition processing (including situation recognition map as necessary) to the self-position estimation unit 132, the situation prediction unit 154, or the like. Furthermore, the situation recognition unit 153 makes the storage unit 111 store the situation recognition map.

The situation prediction unit 154 executes processing for predicting the situation of the own vehicle on the basis of the data or the signal from each unit of the vehicle control system 100 such as the map analysis unit 151, the traffic rule recognition unit 152, the situation recognition unit 153, or the like. For example, the situation prediction unit 154 executes the processing for predicting the situation of the own vehicle, the situation around the own vehicle, the situation of the driver, or the like.

The situation of the own vehicle to be predicted includes, for example, a behavior of the own vehicle, occurrence of an abnormality, a travelable distance, or the like. The situation around the vehicle to be predicted includes, for example, a behavior of a moving object around the own vehicle, a change in a state of the traffic light, a change in the environment such as the weather, or the like. The situation of the driver to be predicted includes, for example, a behavior, a physical condition, or the like of the driver.

The situation prediction unit 154 supplies data indicating the result of the prediction processing to the route planning unit 161, the action planning unit 162, the operation planning unit 163, or the like of the planning unit 134 together with the data from the traffic rule recognition unit 152 and the situation recognition unit 153.

The route planning unit 161 plans a route to a destination on the basis of the data or the signal from each unit of the vehicle control system 100 such as the map analysis unit 151 or the situation prediction unit 154. For example, the route planning unit 161 sets a route from the current position to a designated destination on the basis of a global map. Furthermore, for example, the route planning unit 161 appropriately changes the route on the basis of a situation such as congestions, accidents, traffic regulations, constructions, or the like, the physical condition of the driver, or the like. The route planning unit 161 supplies data indicating the planned route to the action planning unit 162 or the like.

The action planning unit 162 plans an action of the own vehicle to safely travel the route planned by the route planning unit 161 within a planned time on the basis of the data or the signal from each unit of the vehicle control system 100 such as the map analysis unit 151 or the situation prediction unit 154. For example, the action planning unit 162 makes a plan such as starting, stopping, a traveling direction (for example, forward, backward, turning left, turning right, turning, or the like), a traveling lane, a traveling speed, overtaking, or the like. The action planning unit 162 supplies data indicating the planned action of the own vehicle to the operation planning unit 163 or the like.

The operation planning unit 163 plans an operation of the own vehicle to realize the action planned by the action planning unit 162 on the basis of the data or the signal from each unit of the vehicle control system 100 such as the map analysis unit 151 or the situation prediction unit 154. For example, the operation planning unit 163 plans acceleration, deceleration, a traveling track, or the like. The operation planning unit 163 supplies data indicating the planned operation of the own vehicle to an acceleration and deceleration control unit 172, a direction control unit 173, or the like of the operation control unit 135.

The operation control unit 135 controls the operation of the own vehicle. The operation control unit 135 includes the emergency avoidance unit 171, the acceleration and deceleration control unit 172, and the direction control unit 173.

The emergency avoidance unit 171 executes processing for detecting an emergency such as collisions, contacts, entry to the dangerous zone, an abnormality of the driver, an abnormality of the vehicle, or the like on the basis of the detection results of the vehicle exterior information detection unit 141, the in-vehicle information detection unit 142, and the vehicle state detection unit 143. In a case where the occurrence of the emergency is detected, the emergency avoidance unit 171 plans an operation of the own vehicle to avoid an emergency such as sudden stop, sudden turn, or the like. The emergency avoidance unit 171 supplies data indicating the planned operation of the own vehicle to the acceleration and deceleration control unit 172, the direction control unit 173, or the like.

The acceleration and deceleration control unit 172 controls acceleration and deceleration to realize the operation of the own vehicle planned by the operation planning unit 163 or the emergency avoidance unit 171. For example, the acceleration and deceleration control unit 172 calculates a control target value of the driving force generation device or the braking device used to realize the planned acceleration, deceleration, or sudden stop and supplies a control instruction indicating the calculated control target value to the driving system control unit 107.

The direction control unit 173 controls a direction to realize the operation of the own vehicle planned by the operation planning unit 163 or the emergency avoidance unit 171. For example, the direction control unit 173 calculates a control target value of the steering mechanism to realize a traveling track or a sudden turn planned by the operation planning unit 163 or the emergency avoidance unit 171 and supplies a control instruction indicating the calculated control target value to the driving system control unit 107.

The remote operation control unit 113 controls a remote operation of the vehicle 11. For example, the remote operation control unit 113 communicates with outside (for example, control device 13) via the communication unit 103 and approves a remote operation right that is an authority to remotely operate the vehicle 11 within a predetermined range. Furthermore, in a case of receiving a signal used to perform a remote operation (hereinafter, referred to as remote operation signal) from a party to which the remote operation right is granted (party who is permitted to perform remote operation), the remote operation control unit 113 approves the remote operation in response to the received remote operation signal. In a case of permitting the remote operation, the remote operation control unit 113 supplies the remote operation signal to each unit of the vehicle control system 100.

Exemplary Configuration of Control Device 13

Figure 4:
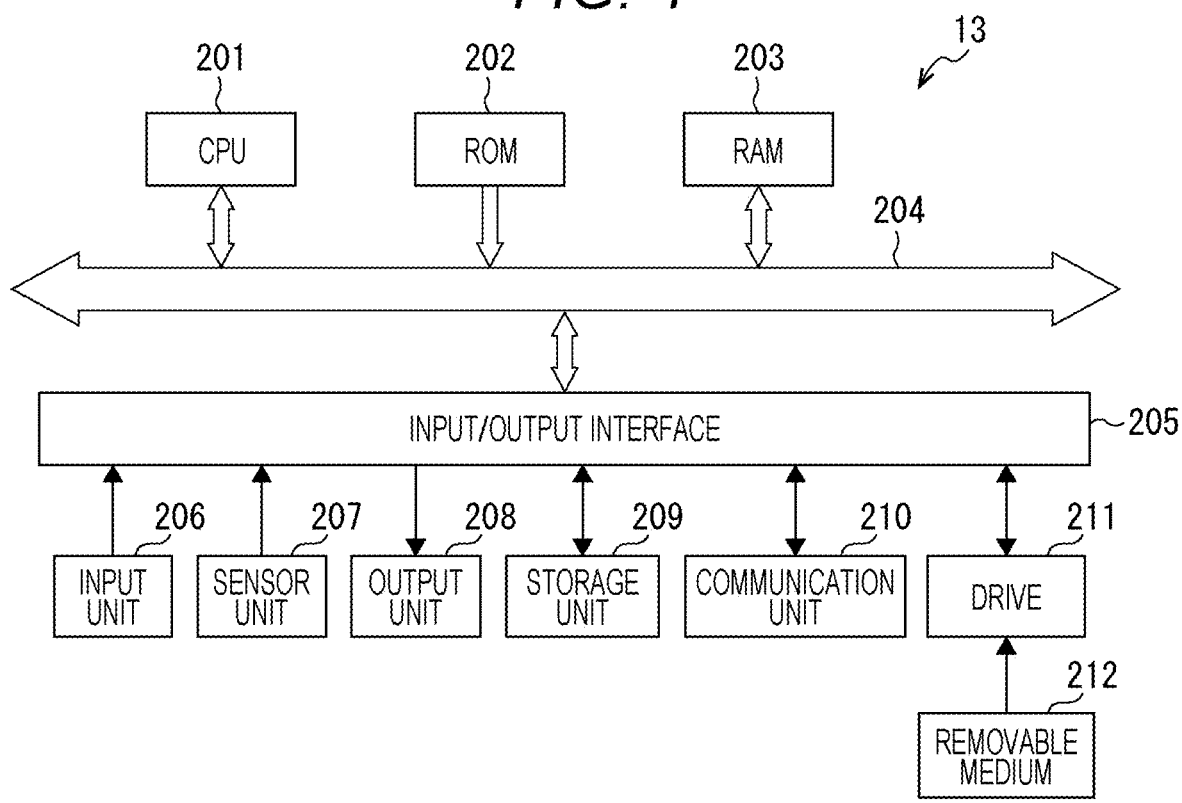
FIG. 4 is a block diagram illustrating an exemplary configuration of a control device.

FIG. 4 is a block diagram illustrating an exemplary configuration of the control device 13, more specifically, an exemplary configuration in a case where the control device 13 is configured by a computer (information processing device).

In the control device 13, a Central Processing Unit (CPU) 201, a Read Only Memory (ROM) 202, and a Random Access Memory (RAM) 203 are connected to each other via a bus 204.

In addition, an input/output interface 205 is connected to the bus 204. An input unit 206, a sensor unit 207, an output unit 208, a storage unit 209, a communication unit 210, and a drive 211 are connected to the input/output interface 205.

The input unit 206 includes an input device such as a keyboard, a mouse, a microphone, or the like.

The sensor unit 207 includes a sensor that detects a position and a movement of each vehicle 11 in or around the parking lot 51, for example, an imaging device, an ultrasonic sensor, a radar, a LiDAR, a sonar, or the like.

The output unit 208 includes an output device such as a display or a speaker.

The storage unit 209 includes a hard disk, a non-volatile memory, or the like.

The communication unit 210 includes a network interface or the like.

The drive 211 drives a removable medium 212 such as a magnetic disk, an optical disk, an optical magnetic disk, or a semiconductor memory.

Note that, hereinafter, in a case where each unit of the control device 13 performs communication via the bus 204 and the input/output interface 205, description of the bus 204 and the input/output interface 205 is omitted. For example, in a case where the CPU 201 and the communication unit 210 communicate with each other via the bus 204 and the input/output interface 205, it is simply described that the CPU 201 and the communication unit 210 communicate with each other.

Exemplary Configuration of Parking Control Unit 251

Figure 5:
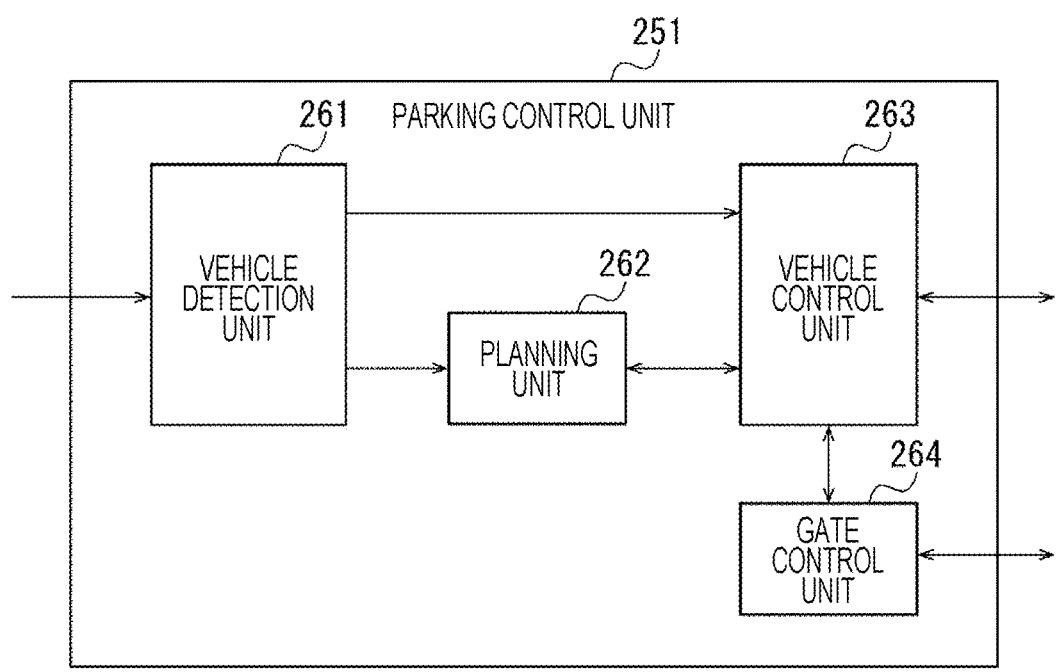
FIG. 5 is a block diagram illustrating an exemplary configuration of a parking control unit.

FIG. 5 is a block diagram illustrating an exemplary configuration of a function of a parking control unit 251 realized by executing a predetermined control program by the CPU 201 of the control device 13.

The parking control unit 251 controls the position of each vehicle 11 in the parking lot 51. The parking control unit 251 includes a vehicle detection unit 261, a planning unit 262, a vehicle control unit 263, and a gate control unit 264.

The vehicle detection unit 261 communicates with each vehicle 11 on the basis of sensor data supplied from the sensor unit 207 or via the communication unit 210 and the network 21 so as to detect the position and the movement of the vehicle 11 in or around the parking lot 51. The vehicle detection unit 261 supplies data indicating the result of detecting the position and the movement of the vehicle 11 to the planning unit 262, the vehicle control unit 263, and the gate control unit 264.

The planning unit 262 creates an unloading plan of each vehicle 11 in the parking lot 51 on the basis of unloading schedule information of each vehicle 11 supplied from the vehicle control unit 263. The unloading schedule information includes, for example, an unloading schedule time of each vehicle 11. Furthermore, the planning unit 262 creates a plan for the position and the movement of each vehicle 11 in the parking lot 51 on the basis of the detection result of the vehicle 11 by the vehicle detection unit 261 and the unloading plan. The planning unit 262 supplies information indicating the plan for the position and the movement of each vehicle 11 to the vehicle control unit 263.

The vehicle control unit 263 communicates with the vehicle 11 via the communication unit 210 and the network 21 and exchanges various data or the like with the vehicle 11. For example, the vehicle control unit 263 acquires or returns the remote operation right of the vehicle 11 and remotely operates the vehicle 11 of which the remote operation right has been granted to the vehicle control unit 263. The vehicle control unit 263 acquires the unloading schedule information from the vehicle 11 and supplies the acquired information to the planning unit 262. The vehicle control unit 263 notifies the vehicle 11 of the position of the getting-off space 54 or receives a notification indicating that the user gets off the vehicle from the vehicle 11.

Furthermore, the vehicle control unit 263 determines whether or not to permit to park or unload the vehicle 11, and in a case where the vehicle 11 is permitted to be parked or unloaded, the vehicle control unit 263 notifies the gate control unit 264 of the permission.

The gate control unit 264 controls the entrance gate at the entrance 52 of the parking lot 51 and the exit gate at the exit 53.

<Processing of Parking Control System 1>

Figure 7:
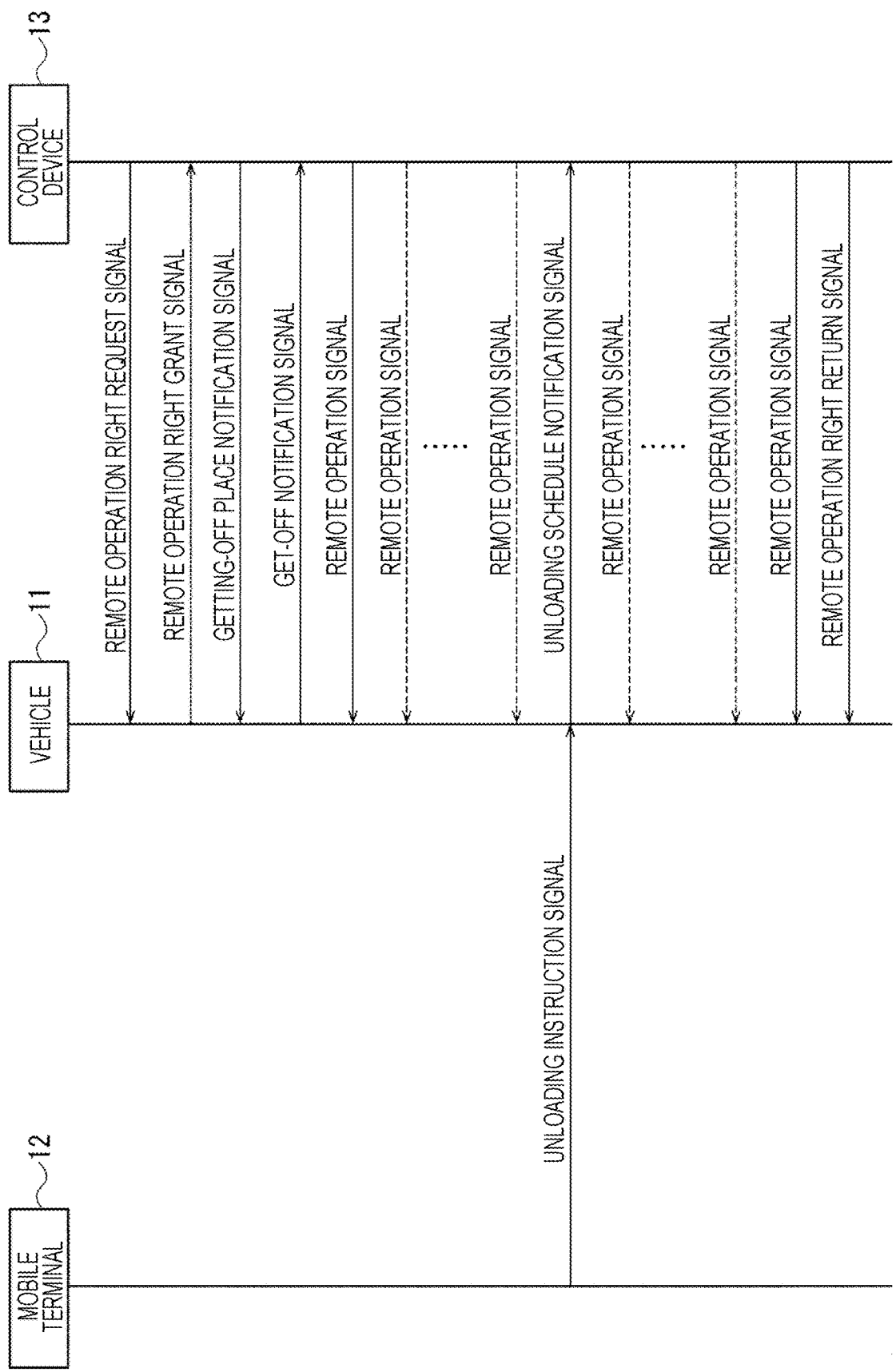
FIG. 7 is a sequence diagram for explaining processing of the parking control system.
Figure 8:
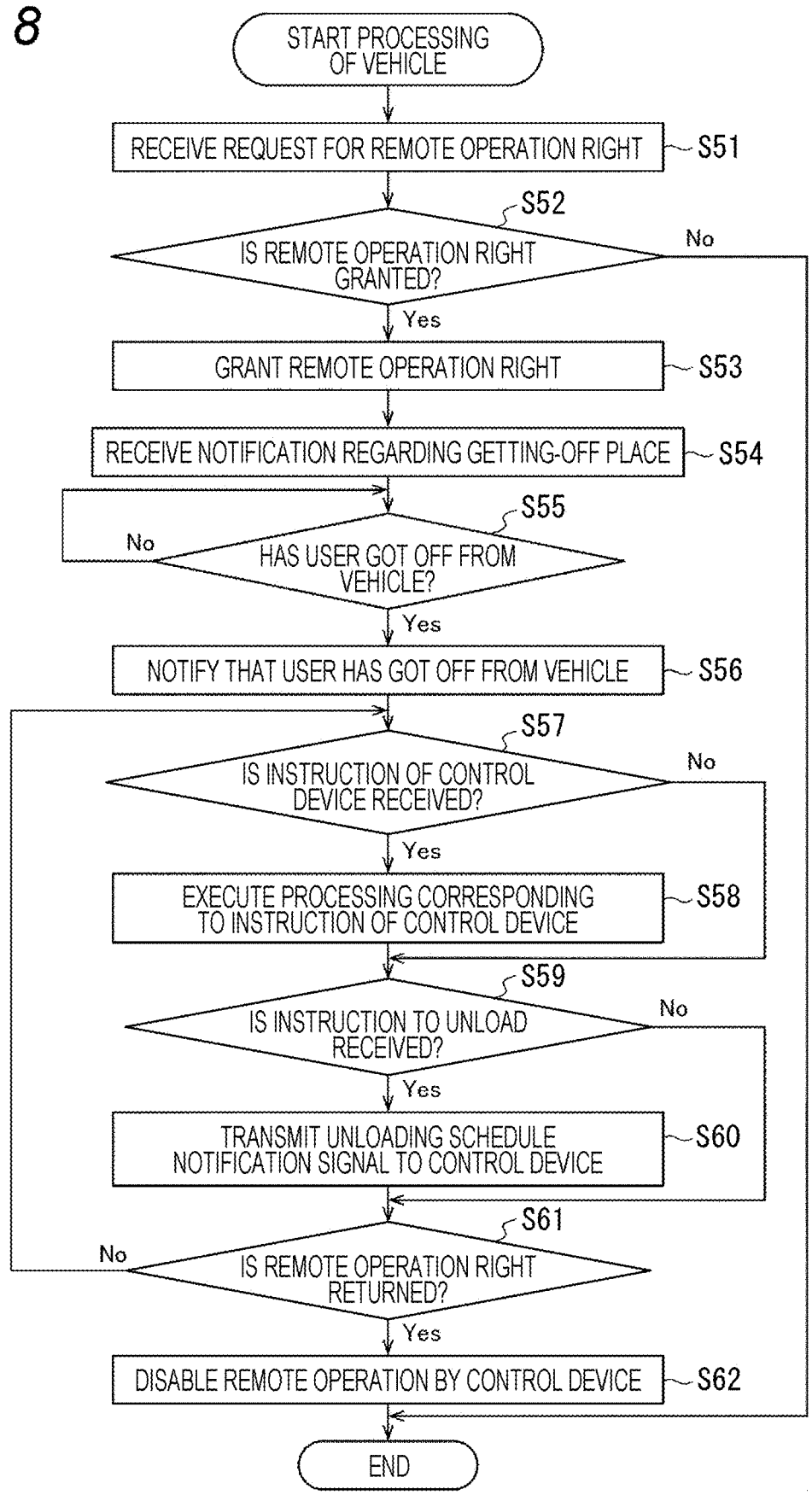
FIG. 8 is a flowchart for explaining processing of a vehicle.

Next, processing of the parking control system 1 will be described with reference to FIGS. 6 to 8.

<Processing of Control Device 13>

First, processing of the control device 13 will be described with reference to the flowchart in FIG. 6 and the sequence diagram in FIG. 7.

In step S1, the vehicle detection unit 261 determines whether or not there is a vehicle 11 that is newly parked.

Each vehicle 11 stops once in front of the entrance 52, for example, before entering the parking lot 51.

On the other hand, in a case where the vehicle 11 that is parking in front of the entrance 52 of the parking lot 51 is detected on the basis of the sensor data from the sensor unit 207 or by communicating with the vehicle 11 via the communication unit 210 and the network 21, the vehicle detection unit 261 determines that there is a vehicle 11 that is newly parked (hereinafter, referred to as vehicle to be newly parked), and the procedure proceeds to step S2.

In step S2, the vehicle control unit 263 requests a remote operation right. Specifically, the vehicle detection unit 261 notifies the vehicle control unit 263 of that the vehicle to be newly parked is detected. The vehicle control unit 263 generates a remote operation right request signal used to request the remote operation right and transmits the generated signal to the vehicle to be newly parked via the communication unit 210 and the network 21.

In response to this, the vehicle to be newly parked receives the remote operation right request signal in step S51 in FIG. 8 as described later.

In step S3, the vehicle control unit 263 determines whether or not the remote operation right is granted.

Specifically, in a case where it is determined in step S52 in FIG. 8 as described later that the remote operation right is granted, the vehicle to be newly parked transmits a remote operation right grant signal in step S53.

The remote operation right grant signal includes remote operation information necessary for remotely operating the vehicle to be newly parked by the control device 13. For example, the remote operation information includes vehicle information of the vehicle to be newly parked, a password necessary for a remote operation, information regarding a range of an operation of the vehicle 11 that can be remotely operated. Furthermore, for example, the remote operation right grant signal may include unloading schedule information including a scheduled time when the vehicle to be newly parked is unloaded from the parking lot 51.

On the other hand, in a case of receiving the remote operation right grant signal from the vehicle to be newly parked via the network 21 and the communication unit 210, the vehicle control unit 263 determines that the remote operation right is granted, and the procedure proceeds to step S4.

Note that the operation which is permitted to be remotely operated according to the grant of the remote operation right is limited to a range necessary for moving the vehicle to be newly parked in the parking lot 51. For example, remote operations of acceleration, deceleration, braking, a traveling direction (steering angle), or the like are permitted. On the other hand, remote operations regarding operations that is not related to the movement of the vehicle to be newly parked such as closing/opening of doors, air conditioning, or access to personal information are not permitted.

Furthermore, the operations that can be remotely operated are limited as necessary. For example, a speed, a moving distance, a moving range (for example, in parking lot 51), and the like of the vehicle to be newly parked are limited.

Moreover, for example, at least one of the place where or the time when the remote operation is performed is limited. For example, the place where the remote operation can be performed is limited within the parking lot 51, or the time when the remote operation can be performed is limited to a time before the unloading schedule time of the vehicle to be newly parked.

As a result, while the vehicle to be newly parked can be moved by the remote operation, theft, car break-in, leakage of personal information, waste of energy consumption, or the like can be prevented.

In step S4, the control device 13 notifies a getting-off place. Specifically, the vehicle control unit 263 generates a getting-off place notification signal including the position of the getting-off space 54 and transmits the generated signal to the vehicle to be newly parked via the communication unit 210 and the network 21.

Furthermore, the vehicle control unit 263 notifies the gate control unit 264 of that the vehicle control unit 263 permits the vehicle to be newly parked to be parked. The gate control unit 264 permits the vehicle to be newly parked to enter the parking lot 51 by opening the entrance gate of the entrance 52 of the parking lot 51.

On the other hand, the vehicle to be newly parked receives a getting-off place notification signal in step S54 in FIG. 8 as described later.

In step S5, the vehicle control unit 263 determines whether or not a user has got off from the vehicle. The determination processing in step S5 is repeatedly executed until it is determined that the user has got off from the vehicle.

For example, after moving the vehicle to be newly parked to the getting-off space 54, the user of the vehicle to be newly parked gets off from the vehicle to be newly parked. In a case of detecting that the user has got off from the vehicle, the vehicle to be newly parked transmits a get-off notification signal used to notify that the user gets off from the vehicle to the control device 13 in step S56 in FIG. 8 as described later.

In response to this, in a case of receiving the get-off notification signal from the vehicle to be newly parked via the network 21 and the communication unit 210, the vehicle control unit 263 determines that the user has got off from the vehicle, the procedure proceeds to step S6.

In step S6, the control device 13 plans a movement of each vehicle 11.

Specifically, the vehicle control unit 263 instructs the planning unit 262 to create a plan to park the vehicle to be newly parked.

The planning unit 262 acquires information indicating the position of each vehicle 11 in the parking lot 51 from the vehicle detection unit 261. For example, the planning unit 262 plans arrangement of each vehicle 11 in the parking lot 51 including the vehicle to be newly parked on the basis of the position of each vehicle 11 in the parking lot 51, the unloading schedule time of each vehicle 11, or the like.

Furthermore, the planning unit 262 moves the vehicle to be newly parked to the planned parking position as necessary and plans a movement of each vehicle 11 to realize the planned arrangement. Moreover, for example, the planning unit 262 plans a moving route, a moving order, or the like of each vehicle 11 as necessary.

The planning unit 262 supplies information indicating the created plan to the vehicle control unit 263.

In step S7, the vehicle control unit 263 moves each vehicle 11. Specifically, the vehicle control unit 263 transmits the remote operation signal to the vehicle 11 to be remotely operated via the communication unit 210 and the network 21 according to the plan created by the planning unit 262.

For example, in a case where the movement of each vehicle 11 is planned by the planning unit 262, the vehicle control unit 263 transmits the remote operation signal including the moving route and the parking position of each vehicle 11 to each vehicle 11. Furthermore, the vehicle control unit 263 controls a timing to transmit the remote operation signal to each vehicle 11 according to the moving order of each vehicle 11 or the like. As a result, each vehicle 11 is remotely operated to move to the planned parking position according to the moving order and the moving route that have been planned.

Furthermore, for example, in a case where only the arrangement of each vehicle 11 is planned by the planning unit 262, the vehicle control unit 263 transmits the remote operation signal including the parking position of each vehicle 11 to each vehicle 11. In response to this, the vehicles 11 are remotely operated to autonomously move to the planned parking position while communicating with each other and cooperating with each other.

As a result, the vehicle to be newly parked is parked at the planned parking position, and the arrangement of the other vehicles 11 is changed as necessary.

Thereafter, the procedure proceeds to step S8.

On the other hand, in a case where the vehicle control unit 263 does not receive the remote operation right grant signal from the vehicle to be newly parked in step S3, the vehicle control unit 263 determines that the remote operation right is not granted, the processing in steps S4 to S7 is skipped, and the procedure proceeds to step S8. In this case, parking of the vehicle to be newly parked in the parking lot 51 is not permitted.

Furthermore, in a case where it is determined in step S1 that there is no vehicle 11 that is newly parked, the processing in steps S2 to S7 is skipped, and the procedure proceeds to step S8.

In step S8, the vehicle control unit 263 determines whether or not unloading schedule is notified. Specifically, in a case of receiving an unloading schedule notification signal transmitted from the vehicle 11 via the network 21 and the communication unit 210 in step S60 in FIG. 8 as described later, the vehicle control unit 263 determines that the unloading schedule is notified, and the procedure proceeds to step S9. Note that the unloading schedule notification signal includes the unloading schedule information that includes the unloading schedule time of the vehicle 11.

Furthermore, in a case where the remote operation right information received from the vehicle to be newly parked in the processing in step S3 includes the unloading schedule information, the vehicle control unit 263 determines that the unloading schedule is notified, and the procedure proceeds to step S9.

In step S9, the planning unit 262 updates the unloading plan. Specifically, the vehicle control unit 263 supplies the unloading schedule information that is newly received to the planning unit 262. The planning unit 262 updates the unloading plan including the unloading schedule time of each vehicle 11 in the parking lot 51 on the basis of the acquired unloading schedule information.

Thereafter, the procedure proceeds to step S10.

On the other hand, in a case where it is determined in step S8 that the unloading schedule is not notified, the processing in step S9 is skipped, and the procedure proceeds to step S10.

In step S10, the planning unit 262 determines whether or not there is a vehicle 11 to be unloaded. Specifically, in a case where there is a vehicle 11 of which an unloading schedule time is within a predetermined time period (for example, within three minutes) from the current time on the basis of the unloading plan, the planning unit 262 determines that there is the vehicle 11 to be unloaded, the procedure proceeds to step S11.

In step S11, the control device 13 plans a movement of each vehicle 11.

Specifically, the vehicle control unit 263 instructs the planning unit 262 to create a plan to move the vehicle 11 to be unloaded (hereinafter, referred to as unloading vehicle) to the unloading waiting space 55.

The planning unit 262 acquires information indicating the position of each vehicle 11 in the parking lot 51 from the vehicle detection unit 261. For example, the planning unit 262 plans arrangement of each vehicle 11 in the parking lot 51 after the unloading vehicle is unloaded on the basis of the position of each vehicle 11 in the parking lot 51 and the unloading schedule time of each vehicle 11, or the like.

Furthermore, the planning unit 262 plans the movement of each vehicle 11 to move the unloading vehicle to the unloading waiting space 55 and to realize the planned arrangement as necessary. Moreover, for example, the planning unit 262 plans a moving route, a moving order, or the like of each vehicle 11 as necessary.

The planning unit 262 supplies information indicating the created plan to the vehicle control unit 263.

In step S12, similarly to the processing in step S6, each vehicle 11 is moved according to the created plan. As a result, the unloading vehicle is moved to the unloading waiting space 55 which a predetermined unloading position according to the remote operation in response to the instruction to move the unloading vehicle (unloading schedule information), and the arrangement of the other vehicle 11 is changed according to the remote operation as necessary.

In step S13, the vehicle control unit 263 returns the remote operation right of the vehicle 11 to be unloaded. For example, the vehicle control unit 263 generates a remote operation right return signal used to return the remote operation right and transmits the generated signal to the unloading vehicle via the communication unit 210 and the network 21.

In response to this, the unloading vehicle receives the remote operation right return signal in step S61 in FIG. 8 as described later.

Furthermore, the vehicle control unit 263 discards the remote operation information of the unloading vehicle.

Moreover, for example, after confirming that parking fee is paid, the vehicle control unit 263 notifies the gate control unit 264 of that the unloading vehicle is permitted to be unloaded. The gate control unit 264 permits the unloading vehicle to be unloaded by opening the gate of the exit 53 of the parking lot 51.

Thereafter, the procedure returns to step S1, and the processing in and subsequent to step S1 is executed.

On the other hand, in a case where it is determined in step S10 that there is no vehicle to be unloaded, the procedure returns to step S1, and the processing in and subsequent to step S1 is executed.

<Processing of Each Vehicle 11>

Next, processing executed by each vehicle 11 in correspondence with the processing of the control device 13 in FIG. 6 will be described with reference to the flowchart in FIG. 8 and the sequence diagram in FIG. 7.

This processing is started, for example, when the vehicle 11 stops once in front of the entrance 52 in order to enter the parking lot 51.

In step S51, the remote operation control unit 113 receives a request for the remote operation right. That is, the remote operation control unit 113 receives the remote operation right request signal transmitted from the control device 13 in step S2 in FIG. 6 via the network 21 and the communication unit 103.

In step S52, the remote operation control unit 113 determines whether or not to grant the remote operation right. For example, the remote operation control unit 113 instructs the output control unit 105 to display a remote operation right approval screen. The output unit 106 displays the remote operation right approval screen under control of the output control unit 105.

With respect to this, a user (for example, driver) of the vehicle 11 selects whether or not to approve the grant the remote operation right via the input unit 101. The input unit 101 supplies data indicating the selection result of the user to the remote operation control unit 113.

In a case where the user permits to grant the remote operation right, the remote operation control unit 113 determines to grant the remote operation right, and the procedure proceeds to step S53.

In step S53, the remote operation control unit 113 grants the remote operation right. Specifically, the remote operation control unit 113 generates a remote operation right grant signal. At this time, for example, in a case where the user inputs the unloading schedule time via the input unit 101, the remote operation control unit 113 makes the unloading schedule information including the unloading schedule time be included in the remote operation right grant signal. The remote operation control unit 113 transmits the remote operation right grant signal to the control device 13 via the communication unit 103 and the network 21.

In step S54, the remote operation control unit 113 receives a notification regarding the getting-off place. Specifically, the remote operation control unit 113 receives the getting-off place notification signal transmitted from the control device 13 in step S4 in FIG. 6 via the network 21 and the communication unit 103. The remote operation control unit 113 instructs the output control unit 105 to notify the position of the getting-off space 54. For example, the output unit 106 outputs an image or sound indicating the position of the getting-off space 54 under the control of the output control unit 105.

Thereafter, for example, the user of the vehicle to be newly parked moves the vehicle to be newly parked to the getting-off space 54.

In step S55, the situation recognition unit 153 determines whether or not the user has got off from the vehicle on the basis of the data indicating the result of the processing for detecting the information in the vehicle 11 supplied from the in-vehicle information detection unit 142. The determination processing is repeated until it is determined that all the users in the vehicle 11 have got off from the vehicle, and in a case where it is determined that all the users in the vehicle 11 have got off from the vehicle, the procedure proceeds to step S56.

In step S56, the situation recognition unit 153 notifies that the user has got off from the vehicle. Specifically, the situation recognition unit 153 generates a get-off notification signal used to notify that the user has got off from the vehicle and transmits the generated signal to the control device 13 via the communication unit 103 and the network 21.

In step S57, the remote operation control unit 113 determines whether or not the instruction of the control device 13 is received. In a case of receiving the remote operation signal transmitted from the control device 13 via the network 21 and the communication unit 103 in step S7 or step S12 in FIG. 6, the remote operation control unit 113 determines that the instruction of the control device 13 is received, and the procedure proceeds to step S58.

In step S58, the vehicle 11 executes processing corresponding to the instruction of the control device 13.

In a case where an operation instructed by the remote operation signal is within the permitted range, the remote operation control unit 113 supplies the remote operation signal to the route planning unit 161.

For example, in a case where the moving route is included in the remote operation signal, the route planning unit 161 supplies data indicating the moving route included in the remote operation signal to the action planning unit 162.

On the other hand, for example, in a case where the moving route is not included in the remote operation signal, the route planning unit 161 communicates with the other vehicle 11 in the parking lot 51 via the communication unit 103 and the network 21 and plans a moving route to the designated moving destination in cooperation with the other vehicle 11. The route planning unit 161 supplies data indicating the planned moving route to the action planning unit 162 or the like.

The action planning unit 162 plans an action of the vehicle 11 to move through the moving route notified from the route planning unit 161. The action planning unit 162 supplies data indicating the planned action of the vehicle 11 to the operation planning unit 163 or the like.

The operation planning unit 163 plans an operation of the vehicle 11 to realize the action planned by the action planning unit 162. For example, the operation planning unit 163 plans acceleration, deceleration, a traveling track, or the like. The operation planning unit 163 supplies data indicating the planned operation of the vehicle 11 to the operation control unit 135 or the like.

The operation control unit 135 controls the driving system 108 via the driving system control unit 107 and controls the operation of the vehicle 11 (for example, acceleration/deceleration control, direction control, or the like) so as to realize the operation of the vehicle 11 planned by the operation planning unit 163.

As a result, the vehicle 11 operates according to the remote operation by the control device 13 and moves to the instructed position (for example, parking position or unloading waiting space 55). For example, the vehicle 11 moves from the getting-off space 54 to the parking position according to the remote operation by the control device 13. Furthermore, for example, the vehicle 11 moves to another parking position according to a remote operation performed in response to the remote operation by the control device 13 to move another vehicle from the getting-off space 54 to the parking position. Moreover, for example, the vehicle 11 moves to the other parking position according to the remote operation performed in response to the remote operation for moving the other vehicle to the unloading waiting space 55 in response to the instruction to the other vehicle from the control device 13 to move to the unloading waiting space 55 (unloading schedule information). Furthermore, for example, the vehicle 11 moves to the unloading waiting space 55 according to the remote operation performed in response to the instruction to the own vehicle by the control device 13 to move to the unloading waiting space 55 (unloading schedule information).

Note that, in a case where the operation instructed by the remote operation signal is out of the permitted range, for example, the remote operation control unit 113 ignores the remote operation signal. This prevents the vehicle 11 to perform the operation outside the permitted range according to the remote operation.

Thereafter, the procedure proceeds to step S59.

On the other hand, in a case where it is determined in step S57 that the instruction of the control device 13 is not received, the processing in step S58 is skipped, and the procedure proceeds to step S59.

In step S59, the remote operation control unit 113 determines whether or not an instruction to unload is received.

For example, in a case where the user inputs the instruction to unload the vehicle 11, the information terminal 12 generates an unloading instruction signal including an unloading schedule time. The unloading schedule time is basically set by the user. However, for example, in a case where the user instructs to immediately unload the vehicle, the information terminal 12 sets the current time or a predetermined time after the current time (for example, three minutes later) as the unloading schedule time. Furthermore, for example, in a case where the user instructs to unload the vehicle after the predetermined time, the information terminal 12 sets the predetermined time after the current time as the unloading schedule time. The information terminal 12 transmits the unloading instruction signal to the vehicle 11 via the network 21 or directly.

In a case of receiving the unloading instruction signal transmitted from the information terminal 12 via the network 21 and the communication unit 103, the remote operation control unit 113 determines that the instruction to unload the vehicle is received, and the procedure proceeds to step S60.

In step S60, the vehicle 11 transmits the unloading schedule notification signal to the control device 13. Specifically, the remote operation control unit 113 generates an unloading schedule notification signal including the unloading schedule time of the vehicle 11 on the basis of the unloading instruction signal and transmits the generated signal to the control device 13 via the communication unit 103 and the network 21.

Thereafter, the procedure proceeds to step S61.

On the other hand, in a case where it is determined in step S59 that the instruction to unload the vehicle is not received, the processing in step S60 is skipped, and the procedure proceeds to step S61.

In step S61, the remote operation control unit 113 determines whether or not the remote operation right is returned. In a case where it is determined that the remote operation right is not returned, the procedure returns to step S57.

Thereafter, until it is determined in step S61 that the remote operation right is returned, the processing in steps S57 and S61 is repeatedly executed.

Figure 6:
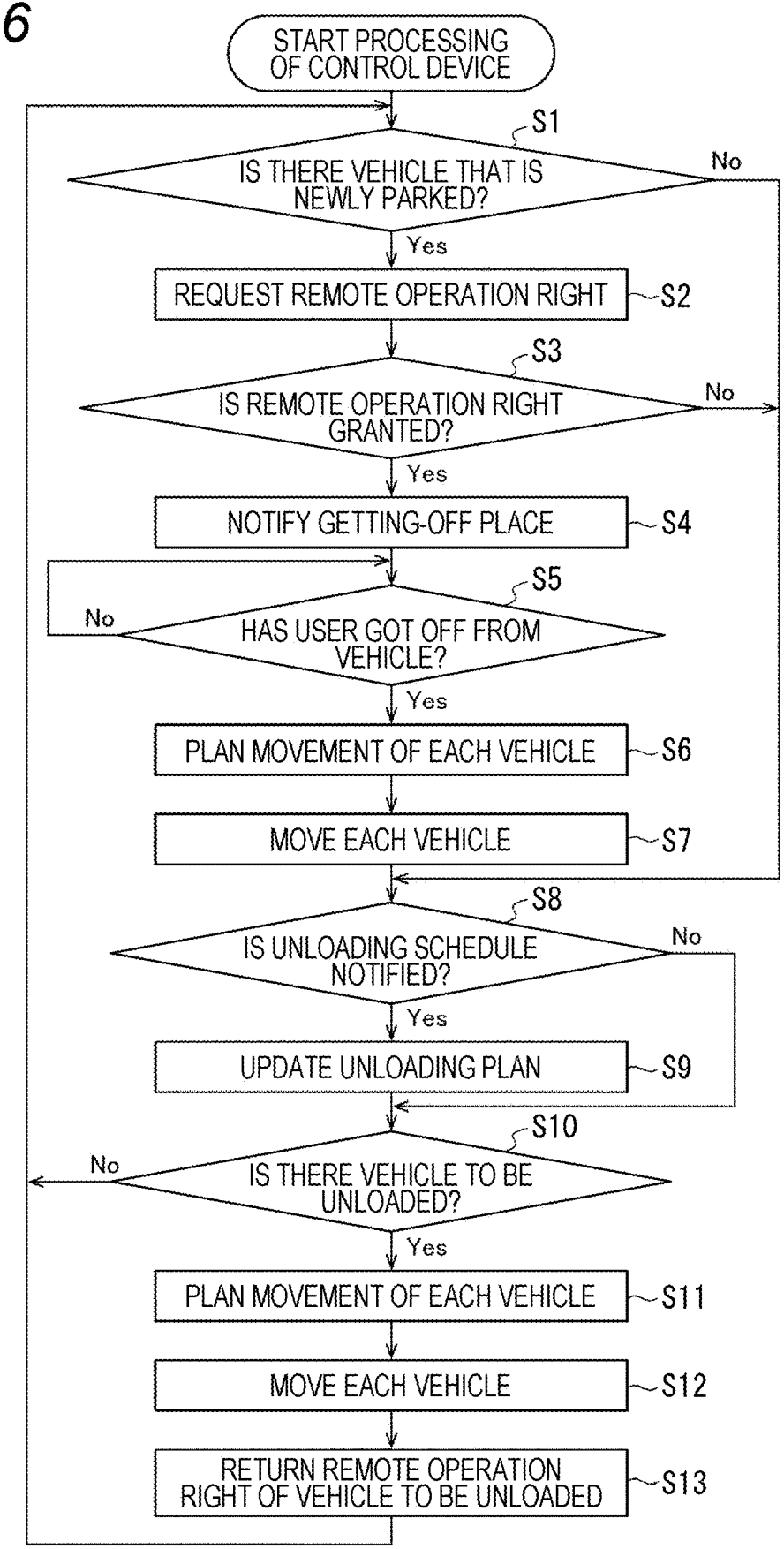
FIG. 6 is a flowchart for explaining processing of the control device.

On the other hand, in a case of receiving the remote operation right return signal transmitted by the control device 13 in step S13 in FIG. 6 via the network 21 and the communication unit 103 in step S61, the remote operation control unit 113 determines that the remote operation right is returned, and the procedure proceeds to step S62.

In step S62, the remote operation control unit 113 disables the remote operation by the control device 13. Thereafter, the remote operation control unit 113 prohibits the remote operation by the control device 13, and even when the remote operation control unit 113 receives the remote operation signal from the control device 13, the remote operation control unit 113 does not respond.

Thereafter, the processing of the vehicle 11 is completed.

On the other hand, in step S52, in a case where the user does not permit to grant the remote operation right, the remote operation control unit 113 determines not to grant the remote operation right, and the processing of the vehicle 11 is completed.

As described above, each vehicle 11 can be smoothly parked and unloaded in the parking lot 51.

Furthermore, the parking space in the parking lot 51 can be effectively used, and the number of vehicles that can be parked can be increased. This improves profitability of the parking lot 51.

Moreover, the user only needs to stop the vehicle 11 in the getting-off space 54 at the time of parking and to board the vehicle 11 moved to the unloading waiting space 55 at the time of unloading. As a result, the user is released from complicated works such as searching for an empty space, entering the parking position, unloading from the parking position, searching for the position where the vehicle 11 is parked, or the like.

<<2. Modification>>

A modification of the embodiment of the present technology described above will be described below.

The timings when the control device 13 requests and returns the remote operation right can be changed. For example, the control device 13 may request the remote operation right after the vehicle 11 has entered the parking lot 51 or return the remote operation right after the vehicle 11 has exited from the parking lot 51.

Furthermore, for example, a parking space dedicated for the vehicle 11 of which the grant of the remote operation right is not permitted in the parking lot 51. Then, in a case where the grant of the remote operation right is not permitted, for example, similarly to a conventional parking lot, it is only required that the user parks the vehicle 11 in a dedicated parking space by himself/herself or unload the vehicle 11 from the parking space.

Moreover, in the above description, an example has been described in which the vehicle 11 transmits the unloading schedule notification signal to the control device 13. However, for example, the information terminal 12 associated with the vehicle 11 may transmit the unloading schedule notification signal regarding the vehicle 11 to the control device 13.

Furthermore, for example, the information terminal 12 may transmit the unloading schedule notification signal to the associated vehicle 11. In response to this, for example, the vehicle 11 may create an action plan and transmit the created action plan to the control device 13. The control device 13 may remotely operate the other vehicle 11 so that the vehicle 11 can operate according to the action plan based on the received action plan of the vehicle 11.

Moreover, the present technology can be applied, for example, to a case where a plurality of vehicles is parked in a predetermined area such as a warehouse or a building other than a general parking lot.

Furthermore, the type of the vehicle to which the present technology can be applied is not particularly limited. For example, the present technology can be applied to a case where a vehicle such as a motorcycle, a bicycle, a personal mobility, construction machinery, agricultural machinery (tractor), or the like, other than a car, a truck, and a bus, is parked in a predetermined area.

Furthermore, the present technology can be applied to a case where a mobile body, such as a ship or an airplane, other than the vehicle is stopped in a predetermined area.

<<3. Others>>

<Method for Providing Software or the Like>

The above-mentioned series of processing can be executed by hardware or software. In a case where the series of the processing is executed by the software, a program included in the software is installed in the vehicle 11 and the control device 13.

For example, in the control device 13, the CPU 201 loads the program stored in the storage unit 209 to the RAM 203 via the input/output interface 205 and the bus 204 and executes the program so that the series of processing is executed.

The program executed by the control device 13 (CPU 201) is, for example, can be provided by recording it to the removable medium 212 as a package medium and the like. Furthermore, the program can be provided via a wired or wireless transmission medium such as a local area network, the Internet, and digital satellite broadcasting.

In the control device 13, the program can be installed to the storage unit 209 via the input/output interface 205 by mounting the removable medium 212 in the drive 211.

Furthermore, the program can be received by the communication unit 210 via the wired or wireless transmission medium and installed to the storage unit 209. In addition, the program can be previously installed to the ROM 202 and the storage unit 209.

Note that, the program executed by the vehicle 11 and the control device 13 may be a program in which processing is executed in a time series manner or a program in which the processing is executed in parallel or at a necessary timing, for example, when a call has been made.

Furthermore, a system means herein an assembly of a plurality of components (devices, modules (parts), and the like), and it is not considered whether or not all the components are in the same housing. Therefore, both of a plurality of devices respectively housed in different housings from each other and connected via the network and a single device having a plurality of modules housed in one housing are systems.

Moreover, the embodiment of the present technology is not limited to the above-mentioned embodiment, and various changes can be made without departing from the scope of the present technology.

For example, the present technology may have a configuration of cloud computing in which a single function is separately performed by a plurality of devices via a network in cooperation.

Furthermore, each step described with reference to the above-mentioned flowchart can be performed by the single device and can be divided and performed by the plurality of devices.

Moreover, in a case where a plurality of kinds of processing is included in one step, the plurality of kinds of processing included in one step can be executed by a single device or can be divided and executed by a plurality of devices.

Example of Combination of Configurations

The present technology can have the following configurations.

(1)

A vehicle control device including:

a remote operation control unit configured to approve a remote operation right that is a right to perform a remote operation of a vehicle; and an operation control unit configured to control an operation of the vehicle according to a remote operation performed in response to an instruction by an information processing device to which the remote operation right is granted to another vehicle to move.

(2)

The vehicle control device according to (1), in which the information processing device receives an instruction to move from the another vehicle or an information terminal associated with the another vehicle, and the operation control unit controls an operation of the vehicle according to a remote operation performed by the information processing device together with a remote operation of the another vehicle in response to the instruction to move.

(3)

The vehicle control device according to (1), in which the another vehicle receives the instruction to move from an information terminal associated with the another vehicle and creates an action plan corresponding to the instruction to move, and the operation control unit controls an operation of the vehicle according to a remote operation performed by the information processing device according to the action plan.

(4)

The vehicle control device according to any one of (1) to (3), in which the remote operation control unit permits the remote operation of the vehicle in a parking lot, and the operation control unit controls the operation of the vehicle according to a remote operation by the information processing device in the parking lot.

(5)

The vehicle control device according to (4), in which the operation control unit moves the vehicle to a designated position in the parking lot according to a moving route designated by the information processing device.

(6)

The vehicle control device according to (4), further including:

a planning unit configured to plan an action to a position designated by the information processing device in cooperation with another vehicle in the parking lot, in which the operation control unit moves the vehicle to the designated position according to the action planned by the planning unit.

(7)

The vehicle control device according to any one of (1) to (6), in which the remote operation control unit limits at least one of a speed of the vehicle, a moving distance of the vehicle, a moving range of the vehicle, a place where the remote operation of the vehicle is able to be performed, or a time when the remote operation of the vehicle is able to be performed.

(8)

The vehicle control device according to any one of (1) to (7), in which the remote operation control unit does not permit a remote operation of a door of the vehicle and an access to personal information in the vehicle.

(9)

A vehicle control method including:

performed by a vehicle control device, approving a remote operation right that is a right to perform a remote operation of a vehicle; and controlling an operation of the vehicle according to a remote operation performed in response to an instruction by an information processing device to which the remote operation right is granted to another vehicle to move.

(10)

A program for causing a computer to execute processing including:

approving a remote operation right that is a right to perform a remote operation of a vehicle; and controlling an operation of the vehicle according to a remote operation performed in response to an instruction by an information processing device to which the remote operation right is granted to another vehicle to move.

(11)

A vehicle including:

a driving unit;

a remote operation control unit configured to approve a remote operation right that is a right to perform a remote operation; and an operation control unit configured to control the driving unit according to a remote operation performed in response to an instruction by an information processing device to which the remote operation right is granted to another vehicle to move.

(12)

An information processing device including:

a vehicle detection unit configured to detect a first vehicle; and a vehicle control unit configured to request a remote operation right that is a right to remotely operate the first vehicle and remotely operate the first vehicle in response to an instruction to move a second vehicle in a case where the remote operation right is granted.

(13)

The information processing device according to (12), further including:

a communication unit configured to receive the instruction to move from the second vehicle or an information terminal associated with the second vehicle, in which the vehicle control unit remotely operates the second vehicle and remotely operates the first vehicle in response to the instruction to move.

(14)

The information processing device according to (12), in which the second vehicle receives the instruction to move from an information terminal associated with the second vehicle and generates an action plan corresponding to the instruction to move, and the vehicle control unit remotely operates the first vehicle according to the action plan.

(15)

The information processing device according to any one of (12) to (14), in which the vehicle control unit controls a position of the first vehicle by moving the first vehicle in a parking lot.

(16)

The information processing device according to (15), in which the vehicle control unit instructs a moving route in the parking lot to the first vehicle.

(17)

The information processing device according to (15) or (16), in which the vehicle control unit requests the remote operation right to a vehicle that enters the parking lot.

(18)

The information processing device according to any one of (15) to (17), in which the vehicle control unit returns the remote operation right in a case where the first vehicle is unloaded from the parking lot.

(19)

An information processing method including:
performed by an information processing device,
detecting a first vehicle;
requesting a remote operation right that is a right to remotely operate the first vehicle; and
remotely operating the first vehicle in response to an instruction to move a second vehicle in a case where the remote operation right is granted.

(20)

A program for causing a computer to execute processing including steps for:
detecting a first vehicle;
requesting a remote operation right that is a right to remotely operate the first vehicle; and
remotely operating the first vehicle in response to an instruction to move a second vehicle in a case where the remote operation right is granted.

Note that the effects described herein are only exemplary and not limited to these. There may be an additional effect.

REFERENCE SIGNS LIST

1 Parking control system
11-1 to 11-n Vehicle
12-1 to 12-n Information terminal
13 Control device
51 Parking lot
100 Vehicle control system
107 Driving system control unit
108 Driving system
112 Automatic driving control unit
113 Remote operation control unit
131 Detection unit
132 Self-position estimation unit
133 Situation analysis unit
134 Planning unit
135 Operation control unit
141 Vehicle exterior information detection unit
143 Vehicle state detection unit
153 Situation recognition unit
161 Route planning unit
162 Action planning unit
163 Operation planning unit
201 CPU
251 Parking control unit
261 Vehicle detection unit
262 Planning unit
263 Vehicle control unit
264 Gate control unit

The invention claimed is:

1. A vehicle control device comprising:
processing circuitry configured to
approve a remote operation right that is a right to perform a remote operation of a vehicle,
control an operation of the vehicle according to a remote operation performed in response to an instruction by an information processing device, to which the remote operation right is granted, to another vehicle to move, and
in response to moving one or more vehicles from their parking position, secure an area of a parking lot used to change vehicles during that time.

2. The vehicle control device according to claim 1, wherein the processing circuitry is further configured to
in response to a determination that the information processing device receives an instruction to move from the another vehicle or an information terminal associated with the another vehicle,
control an operation of the vehicle according to a remote operation performed by the information processing device together with a remote operation of the another vehicle in response to the instruction to move.

3. The vehicle control device according to claim 1, wherein
in response to a determination that the another vehicle receives the instruction to move from an information terminal associated with the another vehicle and creates an action plan corresponding to the instruction to move,
control an operation of the vehicle according to a remote operation performed by the information processing device according to the action plan.

4. The vehicle control device according to claim 1, wherein the processing circuitry is further configured to
permit the remote operation of the vehicle in a parking lot, and
control the operation of the vehicle according to a remote operation by the information processing device in the parking lot.

5. The vehicle control device according to claim 4, wherein the processing circuitry is further configured to
move the vehicle to a designated position in the parking lot according to a moving route designated by the information processing device.

6. The vehicle control device according to claim 4, the processing circuitry is further configured to
plan an action to a position designated by the information processing device in cooperation with another vehicle in the parking lot, and
move the vehicle to the designated position according to the action planned.

7. The vehicle control device according to claim 1, wherein the processing circuitry is further configured to
limit at least one of a speed of the vehicle, a moving distance of the vehicle, a moving range of the vehicle, a place where the remote operation of the vehicle is able to be performed, or a time when the remote operation of the vehicle is able to be performed.

8. The vehicle control device according to claim 1, wherein the processing circuitry is further configured to
prevent a remote operation of a door of the vehicle and an access to personal information in the vehicle.

9. A vehicle control method comprising:
approving a remote operation right that is a right to perform a remote operation of a vehicle;
controlling an operation of the vehicle according to a remote operation performed in response to an instruction by an information processing device to which the remote operation right is granted to another vehicle to move; and
in response to moving one or more vehicles from their parking position, securing an area of a parking lot used to change vehicles during that time.

10. A non-transitory computer-readable storage medium storing computer-readable instructions thereon which, when executed by a computer, cause the computer to perform a method, the method comprising:
approving a remote operation right that is a right to perform a remote operation of a vehicle;

controlling an operation of the vehicle according to a remote operation performed in response to an instruction by an information processing device to which the remote operation right is granted to another vehicle to move; and in response to moving one or more vehicles from their parking position, securing an area of a parking lot used to change vehicles during that time.

11. A vehicle comprising:
a driving unit; and
processing circuitry configured to
approve a remote operation right that is a right to perform a remote operation;
control the driving unit according to a remote operation performed in response to an instruction by an information processing device to which the remote operation right is granted to another vehicle to move; and
in response to moving one or more vehicles from their parking position, secure an area of a parking lot used to change vehicles during that time.

12. An information processing device comprising:
processing circuitry configured to
detect a first vehicle;
request a remote operation right that is a right to remotely operate the first vehicle and remotely operate the first vehicle in response to an instruction to move a second vehicle in a case where the remote operation right is granted; and
in response to moving one or more vehicles from their parking position, secure an area of a parking lot used to change vehicles during that time.

13. The information processing device according to claim 12, wherein the processing circuitry is further configured to
receive the instruction to move from the second vehicle or an information terminal associated with the second vehicle, and
remotely operate the second vehicle and remotely operate the first vehicle in response to the instruction to move.

14. The information processing device according to claim 12, wherein
the second vehicle receives the instruction to move from an information terminal associated with the second vehicle and generates an action plan corresponding to the instruction to move, and the processing circuitry is further configured to remotely operate the first vehicle according to the action plan.

15. The information processing device according to claim 12, wherein the processing circuitry is further configured to control a position of the first vehicle by moving the first vehicle in a parking lot.

16. The information processing device according to claim 15, wherein the processing circuitry is further configured to instruct a moving route in the parking lot to the first vehicle.

17. The information processing device according to claim 15, wherein the processing circuitry is further configured to request the remote operation right to a vehicle that enters the parking lot.

18. The information processing device according to claim 15, wherein the processing circuitry is further configured to return the remote operation right in a case where the first vehicle is unloaded from the parking lot.

19. An information processing method comprising:
detecting a first vehicle;
requesting a remote operation right that is a right to remotely operate the first vehicle;
remotely operating the first vehicle in response to an instruction to move a second vehicle in a case where the remote operation right is granted; and
in response to moving one or more vehicles from their parking position, securing an area of a parking lot used to change vehicles during that time.

20. A non-transitory computer-readable storage medium storing computer-readable instructions thereon which, when executed by a computer cause the computer to perform a method, the method comprising:
detecting a first vehicle;
requesting a remote operation right that is a right to remotely operate the first vehicle; and
remotely operating the first vehicle in response to an instruction to move a second vehicle in a case where the remote operation right is granted; and
in response to moving one or more vehicles from their parking position, securing an area of a parking lot used to change vehicles during that time.

* * * * *